Aug. 15, 1950 R. V. POUND 2,518,931

WAVE GUIDE MIXER

Filed Aug. 1, 1945

INVENTOR
ROBERT V. POUND
BY William D. Hall
ATTORNEY

Patented Aug. 15, 1950

2,518,931

UNITED STATES PATENT OFFICE 2,518,931

WAVE GUIDE MIXER

Robert V. Pound, Cambridge, Mass., assignor, by mesne assignments, to the United States of America as represented by the Secretary of War Application August 1, 1945, Serial No. 608,292

9 Claims. (Cl. 250—13)

This invention relates to electrical apparatus and more particularly to wave guide circuits for coupling local oscillator energy into mixing circuits.

In accordance with present practice radio object-locating equipments employ automatic frequency control (AFC) circuits to maintain the proper relationship between the frequency of the received signal and of the local oscillator signal to produce therefrom a beat signal at the intermediate frequency.

In such equipments using AFC circuits it is highly desirable to employ two mixing circuits fed by the same local oscillator. One of these mixing circuits, the AFC mixer, receives a signal directly from the equipment transmitter, and the second mixing circuit, the signal mixer, receives signals that are picked up by the antenna of the equipment, the reason for employing two mixers being to prevent the frequency of the local oscillator signal from being affected or controlled by signals from nearby equipments or other undesired external sources.

As is well understood in the art, however, coupling of undesired signals from the signal mixer to the AFC mixer may occur through the local oscillator coupling circuits.

It is an object of the present invention, therefore, to present an improved device for coupling the local oscillator to two mixers which embodies the desirable features enumerated above.

For a better understanding of the invention, together with other and further objects thereof, reference is had to the following description taken in connection with the accompanying drawing in which.

Figure 1:
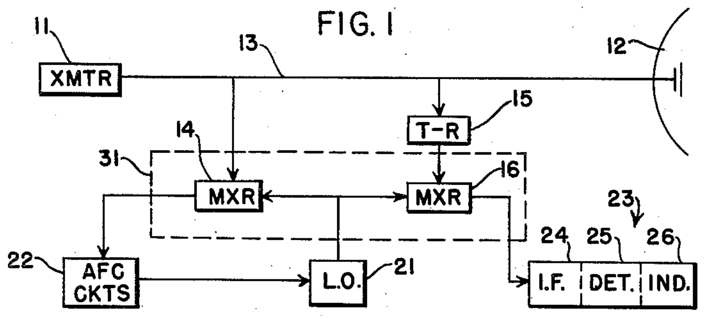
Fig. 1 is a block diagram of a radio object-locating equipment showing the relationship of the present invention to the equipment as a whole.

Reference is now had to Fig. 1 of the drawing in which there is shown in block diagram form a radio object-locating equipment comprising a transmitter 11 which feeds an antenna or other radiating device 12 through suitable transmission means 13. Means are provided for coupling energy from the transmission line 13 to a mixer circuit 14. Signals from the antenna 12 pass through a duplexer or transmit-receive (TR) device 15 to a mixer circuit 16. The duplexer or T-R device 15 is essentially an amplitude discriminator which prevents the powerful transmitted signals from reaching the mixer 16 but permits received weak echo signals to reach the mixer 16. A local oscillator 21 feeds a signal to both mixers 14 and 16. The output of mixer 14 feeds an automatic frequency control (AFC) circuit 22 which in turn controls the frequency of oscillation of the local oscillator 21. The AFC circuits will normally include a frequency discriminator and an AFC amplifier. The output of the mixer 16 is connected to the remainder of the equipment receiver 23 which includes intermediate-frequency amplifiers 24, detector 25, and indicator 26. A dotted block 31 encloses the portion of the system of Fig. 1 toward which the present invention is directed.

In the operation of the system of Fig. 1 a signal from the transmitter 11 is radiated by antenna 12. A portion of the signal from the transmitter 11 is fed to the mixer 14, generally through a directional coupler or other means affording high attenuation thereof, where it is mixed with a signal from oscillator 21. The output of mixer 24 is fed to the AFC circuits 22 where the deviation from a prescribed normal is detected and used to control the frequency of the oscillator 21 in such a manner as to maintain the deviation from normal at a minimum. Signals received by the antenna 12 pass through the duplexer 15 to the mixer 16 wherein they are combined with a signal from the oscillator 21 to produce signals at the intermediate frequency. These IF signals are amplified, detected and indicated in the conventional manner by the remainder of the receiver 23.

Figures 2, 3:
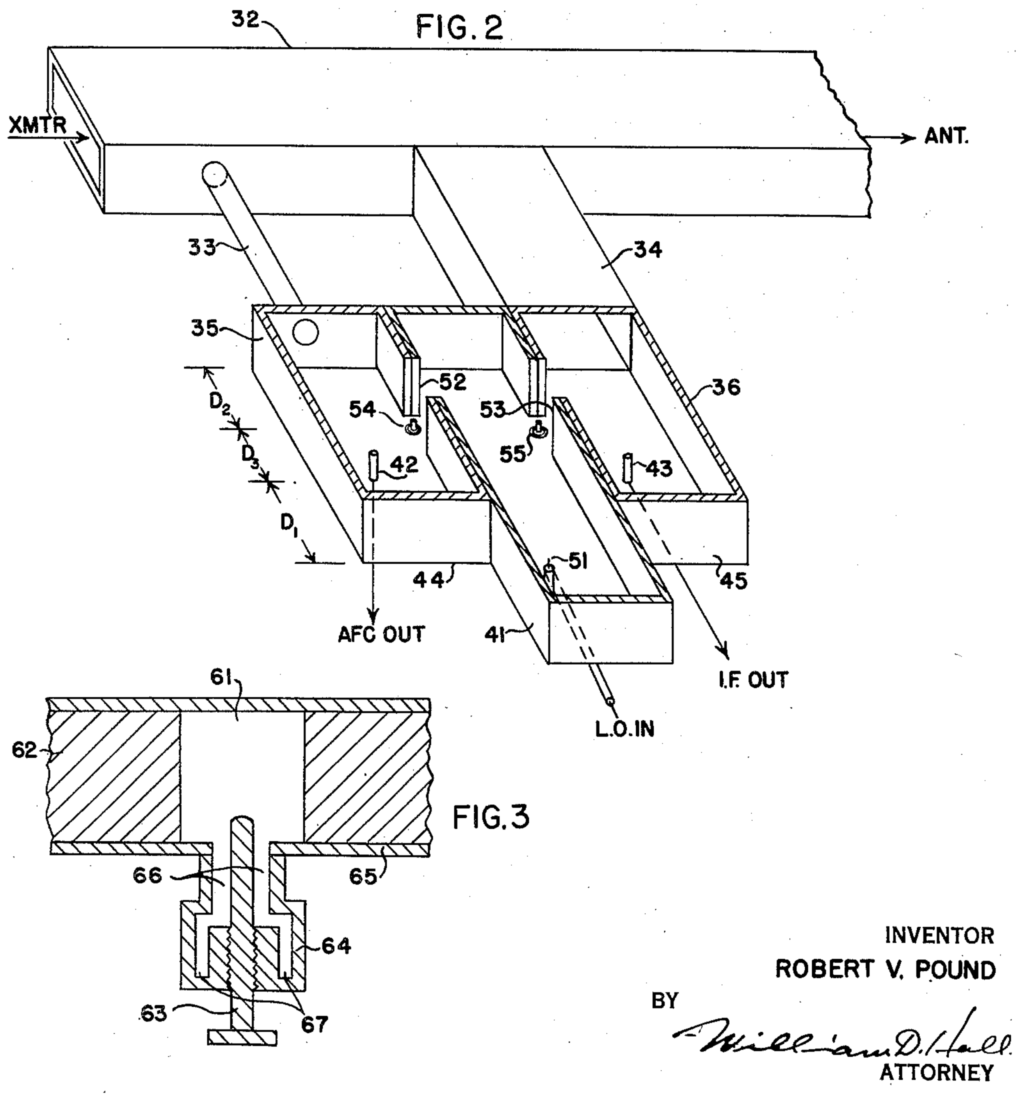
Fig. 2 is a perspective view of the invention with one wall thereof cut away to show the construction in greater detail.
Fig. 3 is a cross-sectional view of one of the tuned coupling windows of Fig. 2.

Reference is now had to Fig. 2 of the drawing in which there is shown the portion of the system of Fig. 1 toward which the present invention is directed. In Fig. 2 there is shown a section of rectangular wave guide 32 which satisfies the requirements of the transmission means 13 of Fig. 1, and to which there is connected a section of cylindrical tubing 33 and a duplexer 34. Both are shown connected to the narrow wall of the guide 32. The tube 33 acts to highly attenuate any signal passing between the guide 32 and an AFC mixer 35. The duplexer 34 connects the wave guide 32 to a signal mixer 36. Inserted between mixer 35 and mixer 36 is a section of wave guide 41. The mixers 35 and 36 are essentially sections of wave guide similar to the wave guide 32. Detectors 42 and 43 are inserted in mixers 35 and 36 at a distance $D_1$ from terminations 44 and 45. The terminations 44 and 45 will normally be short circuits. The distance $D_1$ is approximately one-fourth wavelength as measured within the wave guide and is so adjusted that two detectors 42 and 43 provide a matched load termination for the respective wave guides in which they are inserted. AFC output from detector 42 is provided on the lead labelled "AFC out," while signal output from detector 43 is provided on the lead labelled "IF out." A coupling probe 51 couples a local oscillator signal from "LO in" to the wave guide 41. Coupling windows 52 and 53, together with tuning screws 54 and 55, couple energy from the wave guide 41 into mixers 35 and 36. The coupling windows 52 and 53 and tuning screws 54 and 55 are shown in greater detail in Fig. 3. The windows 52 and 53 are located at a distance $D_2$ from the AFC or signal input to the mixer 35 or 36. The distance $D_2$ is approximately one-fourth wavelength. The detectors 42 and 43 are located a distance $D_3$ from the windows 52 and 53. $D_3$ is approximately one-fourth wavelength. It will be obvious to those skilled in the art that the distances $D_1$, $D_2$ and $D_3$ may be altered by adding any number of half wavelengths thereto and therefore this invention should not be construed to be limited to the use of one-fourth wavelength distances.

The relatively high level transmitted signal will be partially propagated through the tube 33, normally suffering an attenuation of the order of 60 decibels. The transmitted signal which is propagated through the tube 33 will be of sufficient magnitude to operate the mixer 35 despite the high attenuation, but signals which might be received by the antenna will not be sufficiently propagated through tube 33 to affect the mixer operation. A signal from the local oscillator is coupled into the mixer 35 by the window 52. The window 52, together with the tuning screw 54, forms essentially a tuned circuit, however, the screw 54 is so adjusted that the window is greatly detuned and all signals passing through it will be highly attenuated. The local oscillator signal, which is normally much higher than signals received by the antenna, will pass through the window 52 in sufficient magnitude to operate the mixer 35. The local oscillator signal and the transmitted signal are combined in a manner well known to the art to produce an intermediate-frequency signal which may be used for AFC.

In a similar manner received signals pass the T-R device 34 and enter the mixer 36. A signal from the local oscillator is also fed to the mixer through window 53. The window 53 and screw 54 form a tuned circuit which as before is detuned, thus affording a high attenuation of signals through it. It is desirable to have one window, 52 or 53, detuned on one side of resonance and the other window, 53 or 52, detuned on the other side of resonance to minimize load mismatch on the local oscillator. This may be accomplished by turning one screw, 54 or 55, in beyond the tuned point or by adding on the opposite side of the window a fixed probe which approximately tunes the window. Inserting the screw will then detune this window in the direction opposite to that in which the window without the probe is detuned. It has been pointed out that the tube 33 presents a sufficiently attenuated path to prevent any action of the AFC circuits due to received signals. It will also be noted that any signal which would pass from the signal mixer 36 into the local oscillator guide 41 and thence into the AFC mixer will be attenuated first by window 53 and again by window 52. In this manner operation of the AFC circuit is confined to action by transmitted signals and action due to nearby sets or other undesirable external sources minimized or eliminated entirely.

Referring now to Fig. 3, there is shown in greater detail a window 61 in the narrow wall 62 of a rectangular wave guide and a tuning screw 63 which are similar in construction respectively to windows 52 and 53 and screws 54 and 55. A screw holder 64 is fitted or otherwise mechanically and electrically connected to a broad wall 65 of a rectangular wave guide. The screw 63 does not touch the wall 65, but an electrical short circuit is afforded at this point due to the effect of the half wavelength choke 66 which is shorted at its far end 67. The operation of this device as a tuned circuit is well understood in the art.

While there has been described what is at present considered the preferred embodiment of the invention, it will be obvious to those skilled in the art that various changes and modifications may be made therein without departing from the invention.

What is claimed is:

1. A mixer circuit comprising in combination with a local oscillator source, a source of transmitted signals and a source of received signals, first rectangular wave guide means having an opening in one narrow wall thereof, first detector means adapted to be inserted in said first wave guide means, means in conjunction with said first detector means for substantially terminating said first wave guide means in its characteristic impedance, transmission means communicating with said first wave guide means and the source of transmitted signals and adapted to highly attenuate signals passing therethrough, second rectangular wave guide means having an opening in one narrow wall thereof, second detector means adapted to be inserted in said second wave guide means, means in conjunction with said second detector means for substantially terminating said second wave guide in its characteristic impedance, transmit-receive means communicating with said second wave guide means and the source of received signals and adapted to transfer only signals from the source of received signals to said second wave guide means, third rectangular wave guide means having two openings in the narrow walls thereof communicating respectively with the openings in the walls of said first and second wave guide means, first and second tuning plugs respectively adapted to be inserted in the openings connecting said third wave guide means to said first and second wave guide means, said tuning plugs in conjunction with the openings in the walls of said first, second and third wave guide means providing a tunable coupling between said third and first wave guide means and said third and second wave guide means, and coupling means connecting the local oscillator source to said third wave guide means whereby intermediate-frequency signals are provided by said first and second detector means respectively by the combination of transmitted signals and local oscillator signals and the combination of received signals and local oscillator signals.

2. A mixer circuit comprising in combination with a local oscillator source, a source of transmitted signals and a source of received signals, first wave guide means, first detector means adapted to be inserted in said first wave guide means, means in combination with said first detector means for substantially terminating said first wave guide means in its characteristic impedance, first transmission means communicating with said first wave guide means and the source of transmitted signals and adapted to highly attenuate signals passing therethrough, second wave guide means, second detector means adapted to be inserted in said second wave guide means, means in combination with said second detector for substantially terminating said second wave guide in its characteristic impedance, second transmission means communicating with said second wave guide means and the source of received signals and adapted to transfer only signals from the source of received signals to said second wave guide means, third wave guide means, first and second coupling means associated with said third wave guide means and communicating respectively with said first and second wave guide means, third coupling means connecting the local oscillator source to said third wave guide means whereby intermediate-frequency signals are provided by said first and second detector means respectively by the combination of transmitted signals and local oscillator signals and the combination of received signals and local oscillator signals.

3. In a pulse echo system that includes a transmitter of pulsed energy, an antenna coupled to said transmitter, a receiver of echo energy, a duplexer, a local oscillator for obtaining an intermediate frequency and an automatic frequency control circuit to stabilize said local oscillator frequency, the combination comprising a first mixer wave guide coupled to said transmitter to derive an output therefrom and to the input to said automatic frequency control circuit to provide energy thereto, a second mixer wave guide coupled to said antenna through said duplexer to derive received echo energy therefrom and to said receiver input to provide energy thereto, a third wave guide coupled to said local oscillator to derive an output therefrom, and tunable coupling means to couple said third waveguide to said first and second wave guides and tuned to prevent coupling between said first and second wave guides through said third wave guide whereby said first waveguide will mix said transmitted frequency and said local oscillator frequency and provide said mixture to said automatic frequency control circuit and said second waveguide will mix said received echo energy and said local oscillator frequency and provide said mixture to said receiver.

4. The system according to claim 3 wherein said third waveguide is coupled to said first wave guide at a point intermediate the coupling of said first waveguide to said transmitter and to said automatic frequency control circuit, and is coupled to said second wave guide at a point intermediate the coupling of said second waveguide to said duplexer and to said receiver.

5. In a pulse echo system that includes a transmitter, a receiver, a local oscillator to provide an intermediate frequency and an automatic frequency control circuit to stabilize the local oscillator, the combination comprising first wave guide means to mix a portion of the output energy of said transmitter with a portion of the output energy from said local oscillator, means to couple the resultant energy in said first wave guide to said automatic frequency control circuit, second wave guide means to mix the echo energy with a portion of the output energy of said local oscillator, means to couple the resultant energy in said second wave guide to said receiver and third wave guide means common to both first and second wave guide means, to couple said local oscillator output energy into said first and second wave guide means.

6. The device according to claim 5 wherein said third waveguide means is coupled to said first and to said second waveguide means through apertures which are tunable.

7. The device according to claim 6 wherein said apertures are a quarter wave length from the energy input and energy output points of said first and second wave guide means.

8. The device according to claim 5 wherein said first waveguide means is coupled to said transmitter through a tubular waveguide attenuator whereby high level transmitted signals do not overload said automatic frequency control circuit and received signals are prevented from reaching said automatic frequency control circuit.

9. The device according to claim 6 wherein said coupling aperture between said first and third waveguide means is tuned to one side of the resonance point and said coupling aperture between said second and third waveguide means is tuned to the other side of the resonance point whereby intercoupling between said first and second waveguide means through said third waveguide means is attenuated.

ROBERT V. POUND.

REFERENCES CITED

The following references are of record in the file of this patent:

UNITED STATES PATENTS

| Number | Name | Date |
|---|---|---|
| 2,114,036 | Smith et al. | Apr. 12, 1938 |
| 2,304,377 | Roberts | Dec. 8, 1942 |
| 2,376,785 | Krasik | May 22, 1945 |
| 2,379,395 | Ziegler | June 26, 1945 |
| 2,408,826 | Vogel | Oct. 8, 1946 |
| 2,411,553 | Ramo | Nov. 26, 1946 |
| 2,425,013 | Stotz | Aug. 5, 1947 |
| 2,427,098 | Keizer | Sept. 9, 1947 |
| 2,434,293 | Stearns | Jan. 13, 1948 |
| 2,434,294 | Ginzton | Jan. 13, 1948 |
| 2,445,409 | Shank | July 20, 1948 |
| 2,453,988 | Guanella | Nov. 16, 1948 |